(12) United States Patent
Nook (10) Patent No.: US 11,268,607 B1
(45) Date of Patent: Mar. 8, 2022

(54) LEAD SCREW NUTS HAVING THREADS FORMED FROM DIFFERENT MATERIALS

(71) Applicant: Helix Linear Technologies, Beachwood, OH (US)

(72) Inventor: Christopher M. Nook, Russell, OH (US)

(73) Assignee: Helix Linear Technologies, Beachwood, OH (US)

( * ) Notice: Subject to any disclaimer, the term of this patent is extended or adjusted under 35 U.S.C. 154(b) by 634 days.

(21) Appl. No.: 15/436,057

(22) Filed: Feb. 17, 2017

Related U.S. Application Data (60) Provisional application No. 62/296,250, filed on Feb. 17, 2016.

(51) Int. Cl.
| | |
|---|---|
| *F16H 57/01* | (2012.01) |
| *F16H 25/24* | (2006.01) |
| *B29C 45/14* | (2006.01) |
| *B33Y 80/00* | (2015.01) |
| *B29K 27/18* | (2006.01) |
| *B29L 1/00* | (2006.01) |

(52) U.S. Cl.
CPC ....... *F16H 57/01* (2013.01); *B29C 45/14819* (2013.01); *B33Y 80/00* (2014.12); *F16H 25/24* (2013.01); *B29K 2027/18* (2013.01); *B29L 2001/005* (2013.01); *F16H 2025/249* (2013.01)

(58) Field of Classification Search
CPC .... F16H 57/01; F16H 25/24; F16H 2025/249; B33Y 80/00; B29C 45/14819; B29K 2027/18; B29L 2001/005
See application file for complete search history.

(56) References Cited

U.S. PATENT DOCUMENTS

| | | | | |
|---|---|---|---|---|
| 2,202,868 A | | 6/1940 | Reohr | |
| 3,064,758 A | * | 11/1962 | Ohrnberger | B23Q 5/40 184/6.12 |
| 3,202,036 A | * | 8/1965 | Simko | F16B 29/00 411/39 |
| 3,203,303 A | * | 8/1965 | Laisy | F16B 19/1072 411/39 |
| RE28,429 E | * | 5/1975 | Ballentine et al. | F16H 25/2009 74/89.42 |
| 4,571,452 A | | 2/1986 | Giubileo | |
| 4,812,193 A | * | 3/1989 | Gauron | B29C 65/42 156/293 |
| 4,981,735 A | * | 1/1991 | Rickson | F16B 5/01 156/92 |
| 5,367,825 A | * | 11/1994 | Doring | E05F 15/686 49/199 |
| 5,378,099 A | * | 1/1995 | Gauron | B29C 70/68 411/108 |
| 5,388,475 A | * | 2/1995 | Shear, III | F16H 25/2223 264/267 |

(Continued)

*Primary Examiner* — Zakaria Elahmadi
(74) *Attorney, Agent, or Firm* — Calfee, Halter & Griswold LLP (57) ABSTRACT

Lead screw nuts having a body having a threaded opening having a thread region formed from a plurality of different materials having different properties, e.g., a thread region formed from a first material, such as a relatively low friction material, and a second material, such as a relatively high strength material (having thread portions formed from the first material and thread portions formed from the second material).

21 Claims, 11 Drawing Sheets

(56) References Cited

U.S. PATENT DOCUMENTS

| | | | | |
|---|---|---|---|---|
| 5,429,845 A | * | 7/1995 | Newhouse | F17C 1/16 138/30 |
| D367,002 S | | 2/1996 | Grey | |
| D397,607 S | | 9/1998 | Lawson | |
| 5,879,115 A | * | 3/1999 | Medal | B29C 65/08 411/82 |
| 5,913,940 A | * | 6/1999 | Erikson | F16H 25/2009 411/270 |
| 5,967,725 A | * | 10/1999 | Voges | F16B 35/00 411/302 |
| 6,041,671 A | * | 3/2000 | Erikson | F16H 25/2006 411/231 |
| 6,186,356 B1 | * | 2/2001 | Berkley | F17C 1/00 220/304 |
| 6,240,798 B1 | * | 6/2001 | Erikson | F16H 25/2009 74/424.81 |
| 6,467,362 B2 | | 10/2002 | Erikson | B23Q 5/40 74/424.72 |
| 6,564,909 B1 | * | 5/2003 | Razzano | F16D 66/027 116/208 |
| 6,688,874 B1 | * | 2/2004 | Simone | B29C 48/303 425/461 |
| 6,718,694 B2 | | 4/2004 | Stojc et al. | |
| 6,778,052 B1 | * | 8/2004 | Indukaev | F16H 25/24 335/285 |
| 6,854,351 B2 | | 2/2005 | Yabe et al. | |
| D511,499 S | | 11/2005 | Chung | |
| 6,971,620 B2 | * | 12/2005 | Moradell | B60N 2/067 248/422 |
| D554,237 S | | 10/2007 | Lewis et al. | |
| 7,487,692 B2 | * | 2/2009 | Lin | F16H 25/2223 74/424.81 |
| 7,802,953 B2 | * | 9/2010 | Stephen | F16B 5/0208 411/246 |
| 8,028,594 B2 | | 10/2011 | Schroeder | |
| 8,083,452 B2 | * | 12/2011 | Bentrim | F16B 33/006 411/103 |
| 8,087,863 B2 | * | 1/2012 | Flaig | F16B 39/38 411/277 |
| 8,158,728 B2 | | 4/2012 | DeSimone et al. | |
| 8,205,515 B2 | | 6/2012 | Robertson et al. | |
| 8,628,281 B2 | | 1/2014 | Azegami et al. | |
| D713,715 S | | 9/2014 | Kury | |
| 8,967,443 B2 | | 3/2015 | Mccuen | |
| 9,010,210 B2 | * | 4/2015 | Chen | F16H 25/2223 74/424.83 |
| D728,356 S | | 5/2015 | Kury | |
| 9,089,261 B2 | | 7/2015 | Greenburg et al. | |
| D746,129 S | | 12/2015 | Kishida | |
| 9,243,697 B2 | * | 1/2016 | Schroeder | F16H 25/2009 |
| 9,303,738 B1 | * | 4/2016 | Bombardo | F16H 25/24 |
| 9,303,742 B2 | * | 4/2016 | Schroeder | F16H 25/2006 |
| 9,334,937 B2 | | 5/2016 | Schroeder et al. | |
| 9,446,488 B2 | * | 9/2016 | Coronado | B23P 19/04 |
| D775,941 S | | 1/2017 | May et al. | |
| 9,539,139 B2 | | 1/2017 | Andino et al. | |
| 9,599,168 B2 | * | 3/2017 | Rouwens | F16D 9/06 |
| D790,044 S | | 6/2017 | Li | |
| D791,560 S | | 7/2017 | Mitchell | |
| 9,709,086 B2 | | 7/2017 | Gong et al. | |
| D799,315 S | | 10/2017 | May et al. | |
| D817,751 S | | 5/2018 | Burrows | |
| 9,964,201 B2 | | 5/2018 | Lin et al. | |
| D819,436 S | | 6/2018 | Park et al. | |
| D825,322 S | | 8/2018 | Sears et al. | |
| 10,058,354 B2 | | 8/2018 | Jackson et al. | |
| 10,378,257 B2 | * | 8/2019 | Witting | F16B 37/08 |
| 10,392,234 B2 | | 8/2019 | Bryan et al. | |
| D860,774 S | | 9/2019 | Epstein | |
| 10,415,752 B2 | * | 9/2019 | Borkowski | B29C 69/02 |
| 10,433,841 B2 | * | 10/2019 | Williams | A61B 17/1155 |
| 10,543,825 B2 | | 1/2020 | Deberling et al. | |
| D874,245 S | | 2/2020 | Whited et al. | |
| 2002/0028122 A1 | | 3/2002 | Kuo et al. | |
| 2002/0194783 A1 | * | 12/2002 | Stojc | F16H 25/24 49/118 |
| 2003/0138172 A1 | * | 7/2003 | Yabe | F16C 19/20 384/45 |
| 2003/0188410 A1 | | 10/2003 | English | |
| 2005/0136735 A1 | | 6/2005 | Rodrigues et al. | |
| 2006/0150758 A1 | * | 7/2006 | Wohrle | B60N 2/0232 74/89.36 |
| 2007/0045319 A1 | * | 3/2007 | Hogan | B65D 50/041 220/288 |
| 2007/0276180 A1 | * | 11/2007 | Greenburg | A61B 1/00128 600/106 |
| 2009/0120219 A1 | * | 5/2009 | Lykkegaard | F16H 25/2472 74/89.26 |
| 2009/0126521 A1 | * | 5/2009 | Schroeder | F16B 37/0864 74/127 |
| 2009/0265885 A1 | * | 10/2009 | Robertson | B62D 5/22 16/2.1 |
| 2009/0281250 A1 | * | 11/2009 | DeSimone | B29C 66/9534 525/418 |
| 2010/0247263 A1 | * | 9/2010 | Azegami | B23B 31/1107 409/234 |
| 2011/0139851 A1 | * | 6/2011 | McCuen | A61B 17/07207 227/175.1 |
| 2011/0318136 A1 | | 12/2011 | Toyonaga et al. | |
| 2014/0214097 A1 | * | 7/2014 | Jackson | A61B 17/7037 606/305 |
| 2014/0341649 A1 | | 11/2014 | Bryan et al. | |
| 2015/0007676 A1 | * | 1/2015 | Schroeder | F16H 25/24 74/89.32 |
| 2015/0038905 A1 | * | 2/2015 | Andino | A61M 5/347 604/117 |
| 2015/0077215 A1 | * | 3/2015 | Ranky | B29C 70/88 338/47 |
| 2016/0040812 A1 | | 2/2016 | Lai | |
| 2016/0061247 A1 | * | 3/2016 | Gong | F16B 25/10 411/387.2 |
| 2016/0341302 A1 | * | 11/2016 | Lin | F16H 57/0497 |
| 2018/0252363 A1 | * | 9/2018 | Borkowski | F17C 1/16 |
| 2018/0257624 A1 | * | 9/2018 | Deberling | B60T 13/745 |
| 2019/0269445 A1 | * | 9/2019 | Singh | A61B 17/8038 |

\* cited by examiner

PRIOR ART

FIG. 1

PRIOR ART

FIG. 2

PRIOR ART

LEAD SCREW NUTS HAVING THREADS FORMED FROM DIFFERENT MATERIALS

CROSS-REFERENCE TO RELATED APPLICATIONS

The present application claims the benefit of U.S. Provisional Application Ser. No. 62/296,250, filed on Feb. 17, 2016, entitled LEAD SCREW NUTS HAVING THREADS FORMED FROM DIFFERENT MATERIALS, the entire disclosure of which is incorporated herein by reference in its entirety. This application is related to U.S. Design patent application Serial No. 29/594,354, filed on Feb. 17, 2017, and entitled NUTS AND THREADS, the entire disclosure of which is incorporated herein by reference in its entirety.

TECHNICAL FIELD

The present application relates generally to lead screw nuts, and more specifically to lead screw nuts having threads formed from different materials and methods of forming the same.

BACKGROUND

Lead screws and nuts are used to convert rotary motion into linear motion. Friction between the lead screw and the nut results in heat generation, vibration or noise (i.e., loss of efficiency), and wear. For safety and economy, lead screw nuts are generally made from a softer material so that they wear out before the lead screw. But if the nut wears out too quickly, great expense (e.g. downtime, manpower, and replacement part costs) may be incurred in replacing the nut. In some cases, the friction between the lead screw and the nut can generate a static electric charge which can be harmful to nearby equipment.

Lead screw nuts have historically been manufactured from a single material. External features such as mounting flanges or threads, and internal features such as lead screw threads, are typically formed in the material by molding or cutting. The method of manufacture may place restrictions on the material selected.

Much effort is given to selecting or developing lead screw nut materials that will reduce friction and maximize the life of the lead screw without sacrificing the life of the lead screw nut or its manufacturability. A lead screw nut material is selected to balance these—often competing—properties: low friction, low wear, high strength, ease of manufacture, and low cost. Typical materials selected include bronze, brass, plastic, aluminum or steel.

Plastic materials are a significant focus of modern lead screw nut development. Plastic materials can provide desired properties such as lower friction, ease of manufacture, and lower cost. However, low-friction plastic materials tend to have either low strength or high cost. And low-friction plastic materials, in general, have poor electrical conductivity so they tend to promote the generation of static electricity. These are not desirable qualities.

Many of the developments in plastics for lead screw nuts focus on compounding the plastic with different additives.

SUMMARY

Exemplary embodiments of lead screw nuts having threads formed from different materials and methods of making the same are disclosed herein.

An exemplary lead screw nut includes a body having a threaded opening having a thread region. The body is formed from at least first and second materials having different properties. The thread region of the lead screw nut has thread portions formed from the first material and thread portions formed from the second material.

Another exemplary embodiment of the present disclosure relates to a method for forming lead screw nuts having an embedded microchip. The method includes: providing a microchip; affixing the microchip to a mold insert at a location of the insert where the microchip will be embedded in the nut during over-molding; placing the insert into a mold for the nut; over-molding the insert to form the nut with the embedded microchip; and tapping the thread region of the nut. Tapping the thread region of the nut leaves the microchip embedded in the nut and leaving thread portions formed from the first material and thread portions formed from the second material, and wherein the thread portions formed from the first material and thread portions formed from the second material are aligned to form one or more continuous threads.

An exemplary apparatus includes: a lead screw having an associated lead screw drive; a lead screw nut on the lead screw and having an embedded microchip, and a device control unit. The microchip has a microchip control unit in electrical communication with a sensor and a microchip transmitter for transmitting with the microchip transmitter sensor data about a measured parameter of the lead screw nut detected by the sensor. The device control unit is in electrical communication with and controls the lead screw drive and a device receiver for receiving sensor data about the measured parameter of the lead screw nut detected by the sensor and transmitted by the microchip. The device control unit has logic for receiving the sensor data, logic for analyzing the sensor data to determine whether the measured parameter of the nut exceeds a threshold or meets some other condition indicating that the nut needs maintenance or needs to be replaced, and logic for providing a warning if the measured parameter of the lead screw nut exceeds a threshold or meets some other condition indicating that the lead screw nut needs maintenance or needs to be replaced.

BRIEF DESCRIPTION OF THE FIGURES

These and other features and advantages of the present invention will become better understood with regard to the following description and accompanying drawings in which.

DETAILED DESCRIPTION

This Detailed Description merely describes exemplary embodiments of the invention and is not intended to limit the scope of the claims in any way. Indeed, the invention as claimed is broader than and unlimited by the preferred embodiments, and the terms used in the claims have their full ordinary meaning.

Additives can create a plastic compound with the desired bulk properties. However, Applicants have appreciated that it is often desirable to have one property (such as low friction) in one area of the nut (e.g. near the screw thread) and another property (such as high strength) in a different area of the nut. Applicants have appreciated that conventional plastic compounds typically cannot accomplish this.

The invention differs from the conventional approach to manufacturing lead screw nuts in that more than one material is used in the construction of the nut. The materials can be combined to impart complementary properties in different areas of the nut. Or, the materials can be combined to impart complementary properties in the same area of the nut. For example, an ultra-low-friction material can be configured to be the primary contact surface on the threads while a high-strength material makes up the bulk structure of the nut. Or, for example, a low-friction/moderate-strength material can be intermingled with a high-strength, high-conductivity material at the primary contact surface to provide better static dissipation without causing excessive wear on the lead screw. Materials can be selected to provide optimum performance in low friction, low wear, high strength, or static dissipation, and combined in a way that the material property is applied where it will have the most effect. Materials may also be selected and applied so that their properties combine, or cancel, in a synergistic way to eliminate an undesired side effect such as generating a static electric charge, vibration or noise.

An exemplary lead screw nut has a thread region formed from a plurality of different materials having different properties, e.g., a thread region formed from both a relatively low friction material and a relatively high strength material.

Figure 1:
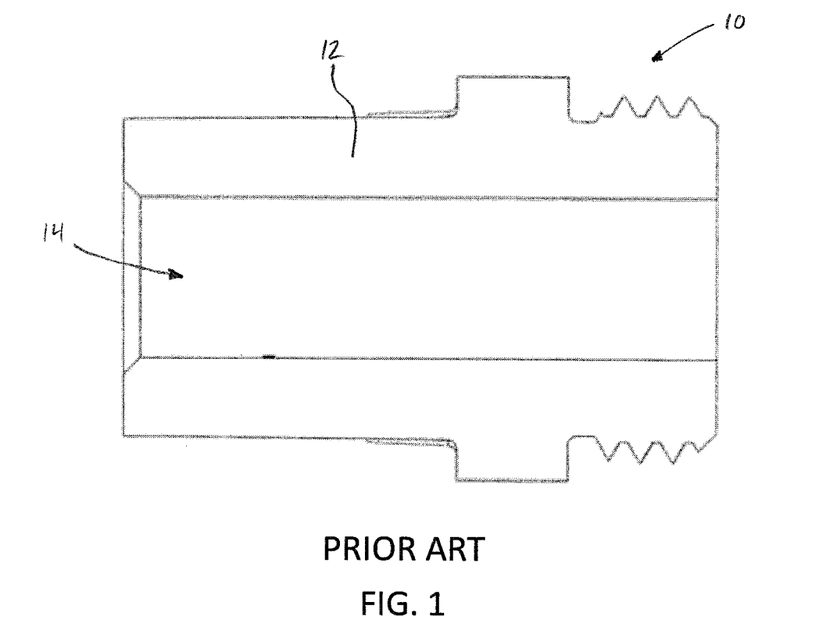
FIG. 1 is a cross-section of a Prior Art lead screw nut before threads are formed on the inner diameter.
Figure 2:
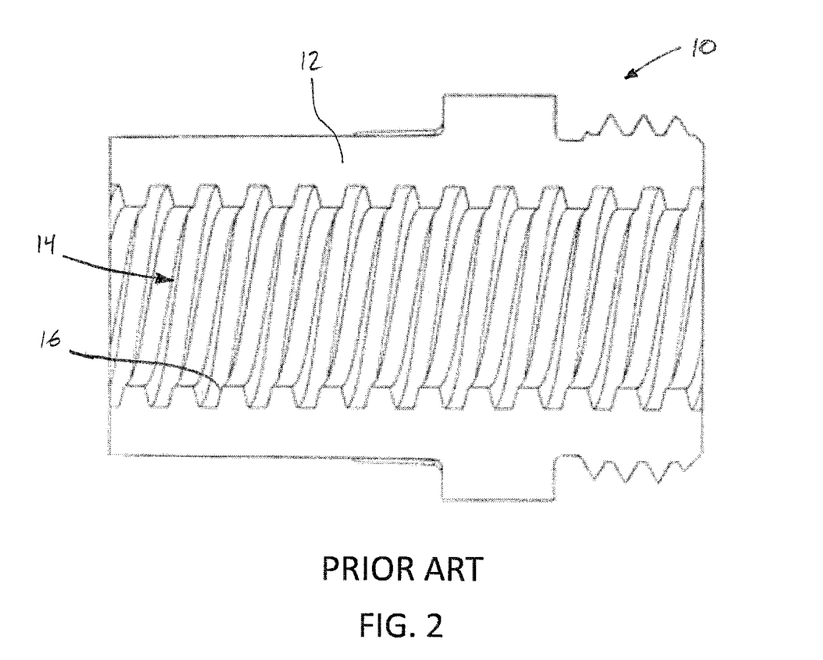
FIG. 2 is a cross-section of a Prior Art lead screw nut after threads are formed on the inner diameter.
Figure 3:
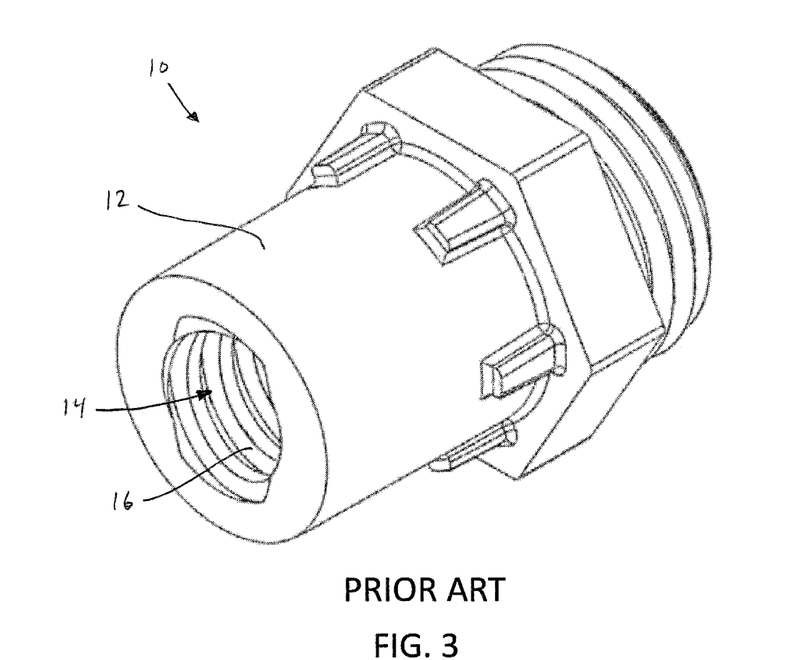
FIG. 3 is an isometric view of the Prior Art lead screw nut of FIG. 2.

Referring now to FIGS. 1-3, a cross-section of a prior art conventional nut 10 is shown having an inner diameter 14 ("ID") before threads are formed via tapping, rolling, cutting, or any other suitable method of forming threads in the material of the nut 10. The nut 10 is formed of a single material 12. FIG. 2 shows the same view of the same nut 10 after threads 16 have been formed on the ID. FIG. 3 shows an isometric view of the same nut in FIG. 2. Because the threads 16 of the nut 10 are formed in the single material 12 of the nut 10, the physical properties of the threads 16 are substantially constant along the ID 14 of the nut 10.

Broadly speaking, the exemplary lead screw nuts comprise a body having a threaded opening having a thread region. In exemplary embodiments, the body is formed from at least first and second materials having different properties. In exemplary embodiments, the thread region of the lead screw nut has thread portions formed from the first material and thread portions formed from the second material. In exemplary embodiments, the thread portions formed from the first and second materials are large enough to be visible to the naked eye, as compared to a plastic of one material with small particle additives of another material. In exemplary embodiments, the thread portions formed from the softer material will extend into the body formed by the harder material.

In exemplary embodiments, exemplary lead screw nuts have a thread region formed from a plurality of different materials having different properties, e.g., a thread region formed from a relatively low friction material (such as polytetrafluoroethylene (PTFE)) and a relatively high strength material (such as polyoxymethylene (POM), also known as simply "acetal" (e.g., Delrin® and Celcon® materials). Other materials might be suitable for the softer, relatively low friction material, e.g., "filled" PTFEs (mineral fiber-filled PTFE (PTFE-MF), polyimide-filled PTFE (PTFE-PI)) or PTFE alloys (PTFE/polyphenylene sulfide (PPS)), e.g., Rulon® material, or mixtures or blends of any of the foregoing. Other materials might be suitable for the relatively high strength material, e.g., PPS, or polyetheretherketone (PEEK), or polyamide (PA, e.g., Nylon® brand polyamide), or mixtures or blends of any of the foregoing. Thus, in exemplary embodiments, the thread region of the lead screw nut has thread portions formed from PTFE (or any of the softer, low friction materials herein) and thread portions formed from acetal (or any of the harder materials herein). In various exemplary nut embodiments, about 45% to about 55% of the surface area of the threaded region is the first material and about 55% to about 45% of the surface area of the threaded region is the second material. In various other exemplary nut embodiments, about 40% to about 60% of the surface area of the threaded region is the first material and about 60% to about 40% of the surface area of the threaded region is the second material. In certain embodiments, additives may be added to either or both of the nut and insert materials to provide additional properties. For example, metallic or magnetic powder may be added to provide magnetic characteristics.

In exemplary embodiments, the body of the lead screw nut is formed by forming an insert out of the first material, over molding the second material over the insert, and forming the thread region of the lead screw nut (perhaps after boring a central opening), leaving thread portions formed from the first material and thread portions formed from the second material. The insert before over molding can have any of a number of different configurations, e.g.: a dumbbell outside surface, a dumbbell-like outside surface with three or four or more of the wider regions, a fluted outside surface, a helical outside surface, an outside surface with discs wrapped around the body of the insert, an insert including an electronic chip, board or microelectomechanical device embedded into it, a 2D or 3D spiked outside surface (like a "jack" as in the metal pieces from the child's game jacks), a 2D jack, a 3D jack, a Frisbie, a nail, a snowflake, etc. One insert of the first material or a plurality of inserts of the first material or a number of different materials can be inserted into the mold cavity for the lead screw nut and over molded with the second material. For some of the exemplary insert configurations, e.g., a dumbbell, a fluted insert, or a helical insert, there are benefits to locating the insert in the nut mold on or approximately on the central axis of the nut. For some of the other exemplary insert configurations, e.g., a jack, a nail, a snowflake, etc., placement inside the nut mold can be less critical, and it might be sufficient to simply load a plurality of one or more of those inserts of the first material into the mold cavity, so long as when the second material is over molded over the inserts, some of the inserts are in the thread region so that when the nut is tapped, the resulting nuts have thread portions formed from the first material and thread portions formed from the second material.

Figure 4:
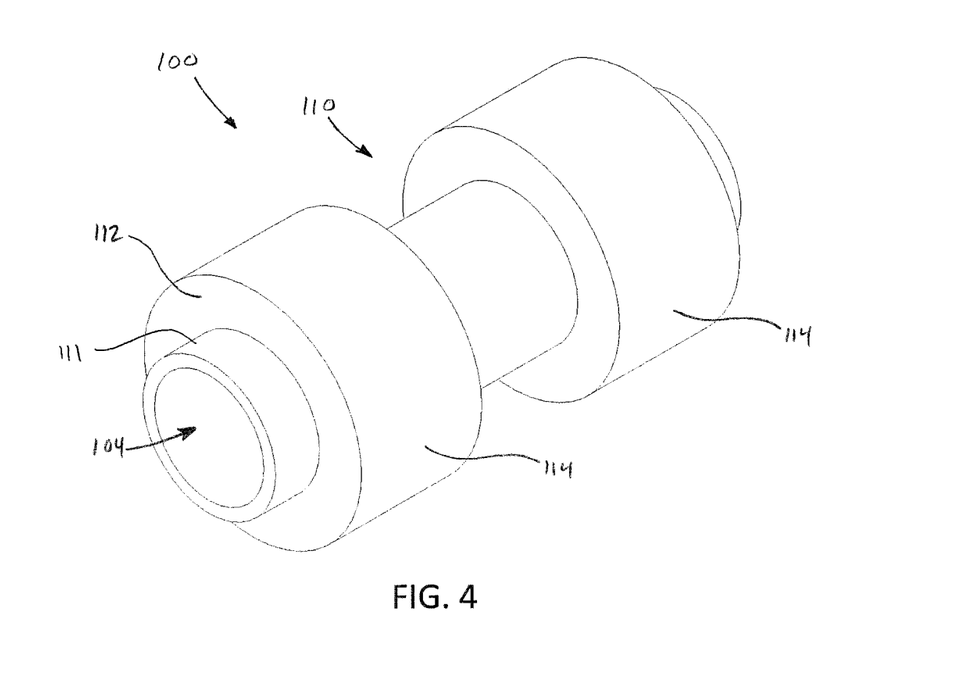
FIG. 4 is an isometric view of an exemplary insert of an exemplary nut before the nut is formed around the insert.
Figure 5:
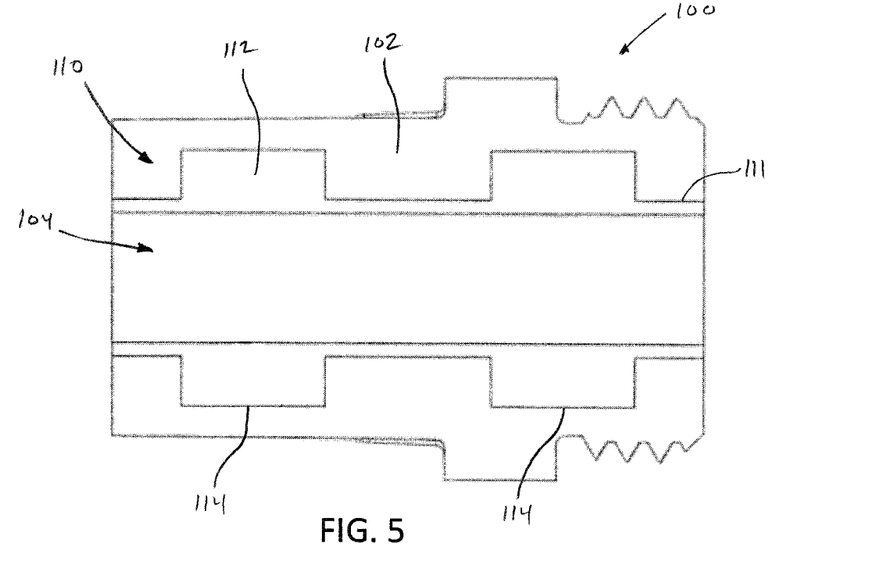
FIG. 5 is a cross-section view of the exemplary nut formed around the insert of FIG. 4 before threads are formed on the inner diameter.
Figure 6:
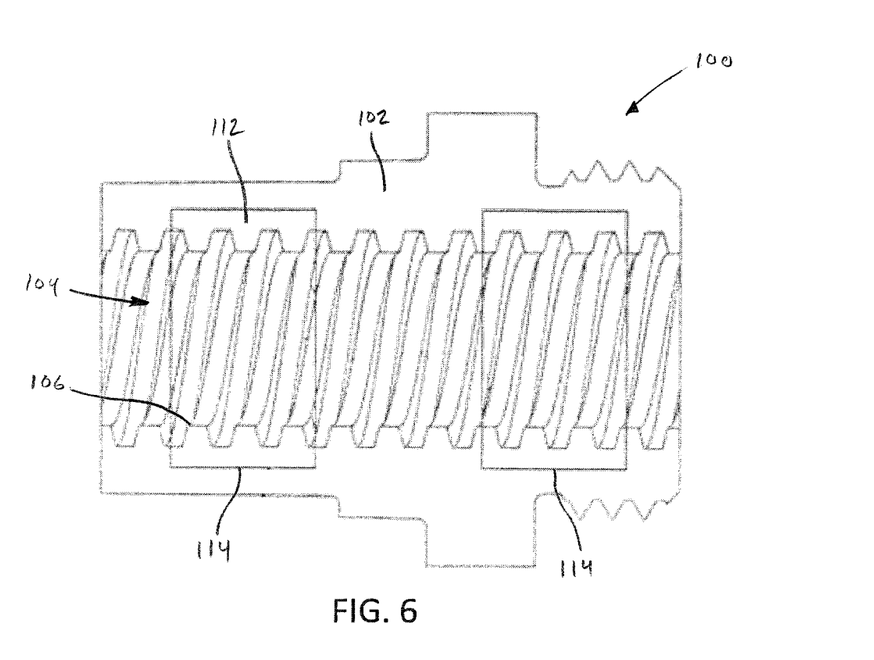
FIG. 6 is a cross-section view of the exemplary nut of FIG. 5 after threads are formed on the inner diameter.

Referring now to FIGS. 4-6, an exemplary lead screw nut 100 having a dumbbell shaped insert 110 is shown. FIG. 4 shows the dumbbell shaped insert 110 having a cylindrical body 111, an inner diameter 104 and two cylindrical portions or plates 114 that have a larger diameter than the cylindrical body 111. The insert 110 is formed from an insert material 112. FIG. 5 shows a cross-section view of the insert 110 after the nut 100 has been formed around the insert 110. To form the nut 100, the insert 110 is placed in a mold and then a nut material 102 is molded over the insert 110. After the nut 100 is formed around the insert 110, threads 106 are formed on the inner diameter 104. As can be seen in FIG. 6, which shows a cross-section of the nut 100 with formed threads 106, the thread forming step removes the cylindrical body 111 of the insert leaving the plates 114 made from the insert material 112 embedded in the nut 100 made from the nut material 102. In this exemplary embodiment, the nut material 102 would typically be a stronger material than the insert material 112, such as acetal, (or PPS or PEEK or PA, etc.), for example, and the insert material 112 would typically be a material with a lower friction than the nut material 102, such as PTFE (or PTFE-MF or PTFE-PI or PFTE/PPS, etc.), for example.

The shape of the insert 110 can be adjusted to give any desired proportion of the insert material 112 to the nut material 102 that may be desired. As mentioned herein, the dumbbell type insert need not have two larger regions or plates, like a traditional dumbbell, but it can have two plates. Exemplary dumbbell type inserts can have three or four or five or more plates. Additionally, the longitudinal portion of the insert need not be uniform from end to end. The length of the plates may also be varied to alter the proportion of the insert material present on the surface of the threads. Each plate may have the same length, or the plates may have varying lengths. Additionally, the plates may be bent, curved, tilted relative to a central axis, or otherwise altered in their shape to change the size and shape of the portion of the threads formed from the material of the insert.

In this example, in the final nut, about 50% (48%-52%) of the surface area of the threaded region is nut material 102 and about 50% (52%-48%) of the surface area of the threaded region is insert material 112. This percentage can be controlled by the length of the plates 114 used in the process. In various exemplary nut embodiments using the dumbbell shaped insert, about 45%-55% of the surface area of the threaded region is nut material 102 and about 55%-45% of the surface area of the threaded region is insert material 112. In various other exemplary nut embodiments using the dumbbell insert, about 40%-60% of the surface area of the threaded region would be nut material 102 and about 60%-40% of the surface area of the threaded region would be insert material 112.

Figure 7:
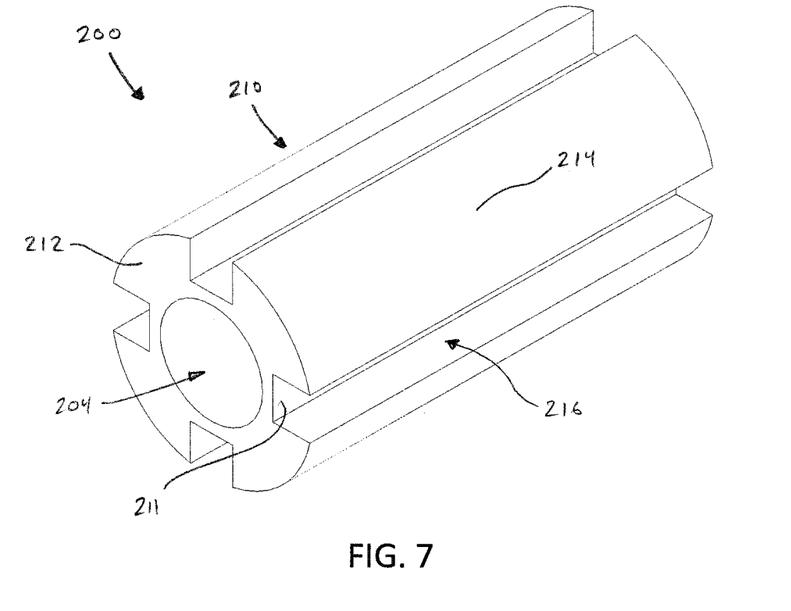
FIG. 7 is an isometric view of an exemplary insert of an exemplary nut before the nut is formed around the insert.
Figure 8:
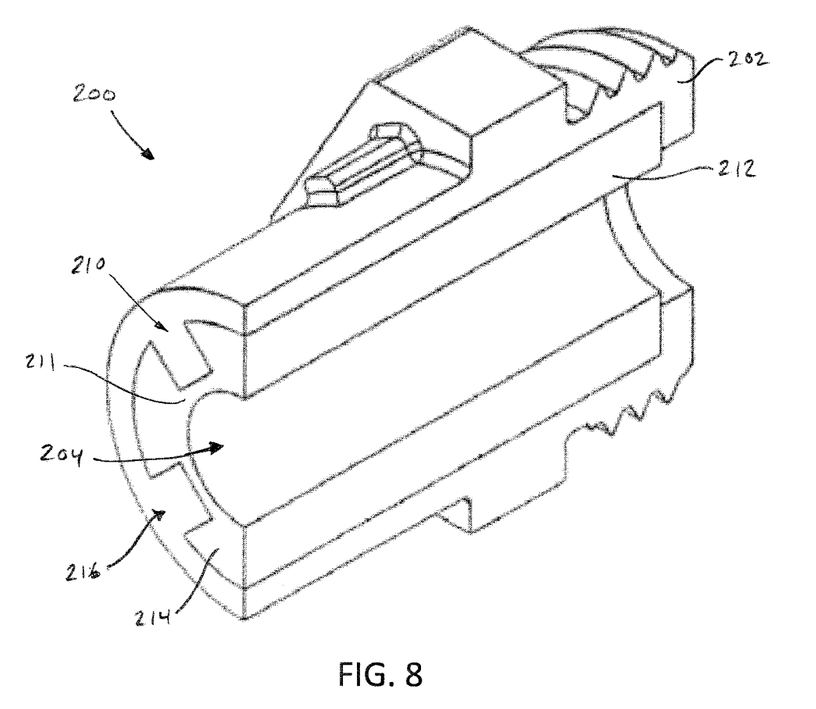
FIG. 8 is a cross-section view of the exemplary nut formed around the insert of FIG. 7 before threads are formed on the inner diameter.
Figure 9:
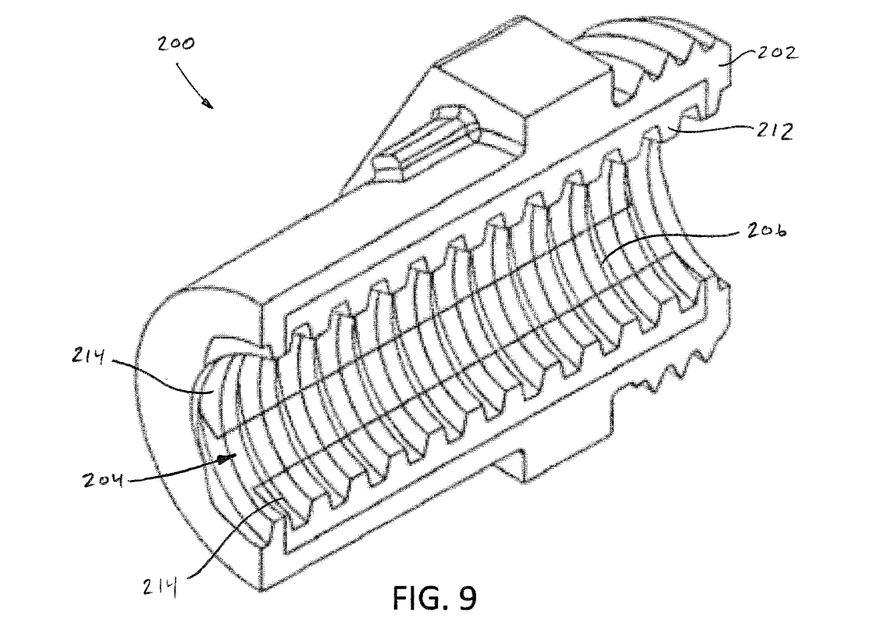
FIG. 9 is a cross-section view of the exemplary nut of FIG. 8 after threads are formed on the inner diameter.

Referring now to FIGS. 7-9, an exemplary lead screw nut 200 having a fluted insert 210 is shown. FIG. 7 shows the fluted insert 210 having a body 211, an inner diameter 204 and four flutes 214 having a larger diameter than the body 211, the flutes 214 being separated by gaps 216. The insert 210 is formed from an insert material 212. FIG. 8 shows a cross-section view of the insert 210 after the nut 200 has been formed around the insert 210. To form the nut 200, the insert 210 is placed in a mold and then a nut material 202 is molded over the insert 210. After the nut 200 is formed around the insert 210, threads 206 are formed on the inner diameter 204. As can be seen in FIG. 9, which shows a cross-section of the nut 200 with formed threads 206, the thread forming step removes the body 211 of the insert leaving the flutes 214 made from the insert material 212 embedded in the nut 200 made from the nut material 202. In this exemplary embodiment, the nut material 202 would typically be a stronger material than the insert material 212, such as acetal, (or PPS or PEEK or PA, etc.), for example, and the insert material 212 would typically be a material with a lower friction than the nut material 202, such as PTFE (or PTFE-MF or PTFE-PI or PFTE/PPS, etc.), for example.

The shape of the insert 210 can be adjusted to give any desired proportion of the insert material 212 to the nut material 202 that may be desired. In certain embodiments, the fluted insert may have two flutes, three flutes, or five or more flutes. Additionally, the insert need not be uniform in cross section from end to end. For example, the radial width of the flutes and gaps may also be varied to alter the proportion of the insert material present on the surface of the threads. Each flute may have the same width, or the flutes may have varying widths. Additionally, the flutes may have a width that varies along the length of the flute.

In this example, in the final nut, about 50% (48%-52%) of the surface area of the threaded region is nut material 202 and about 50% (52%-48%) of the surface area of the threaded region is insert material 212. This percentage can be controlled by the width of the flutes 214 and gaps 216 used in the process. In various exemplary nut embodiments using the fluted insert, about 45%-55% of the surface area of the threaded region is nut material 202 and about 55%-45% of the surface area of the threaded region is the insert material 212. In various other exemplary nut embodiments using the fluted insert, about 40%-60% of the surface area of the threaded region would be nut material 202 and about 60%-40% of the surface area of the threaded region would be insert material 212.

Figure 10:
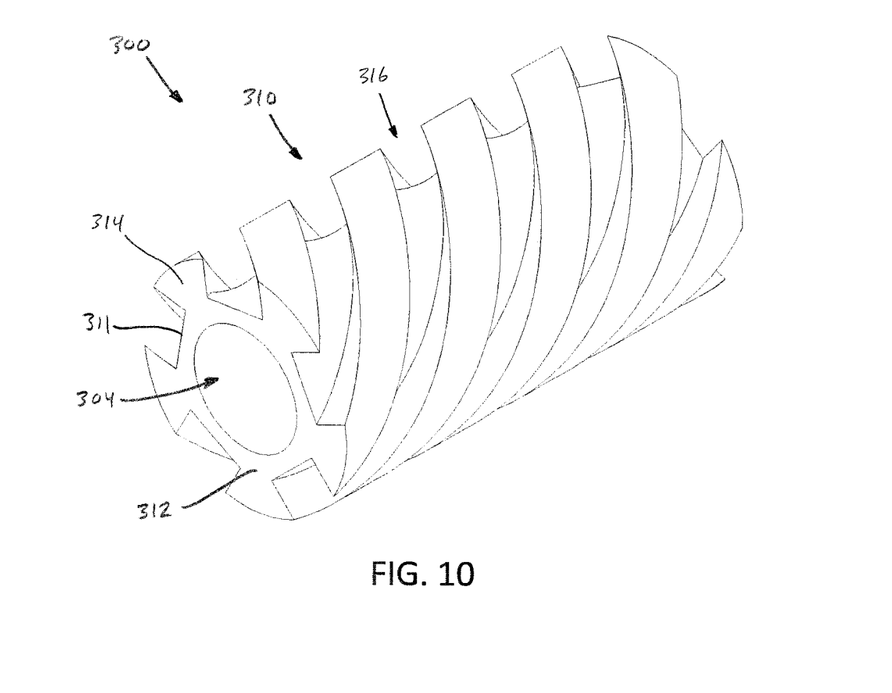
FIG. 10 is an isometric view of an exemplary insert of an exemplary nut before the nut is formed around the insert.
Figure 11:
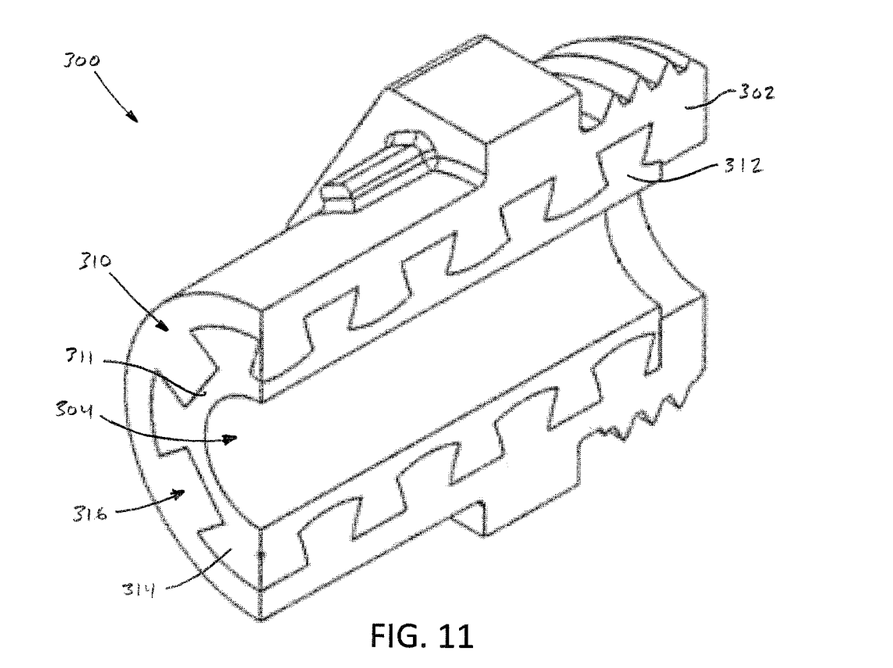
FIG. 11 is a cross-section view of the exemplary nut formed around the insert of FIG. 10 before threads are formed on the inner diameter.
Figure 12:
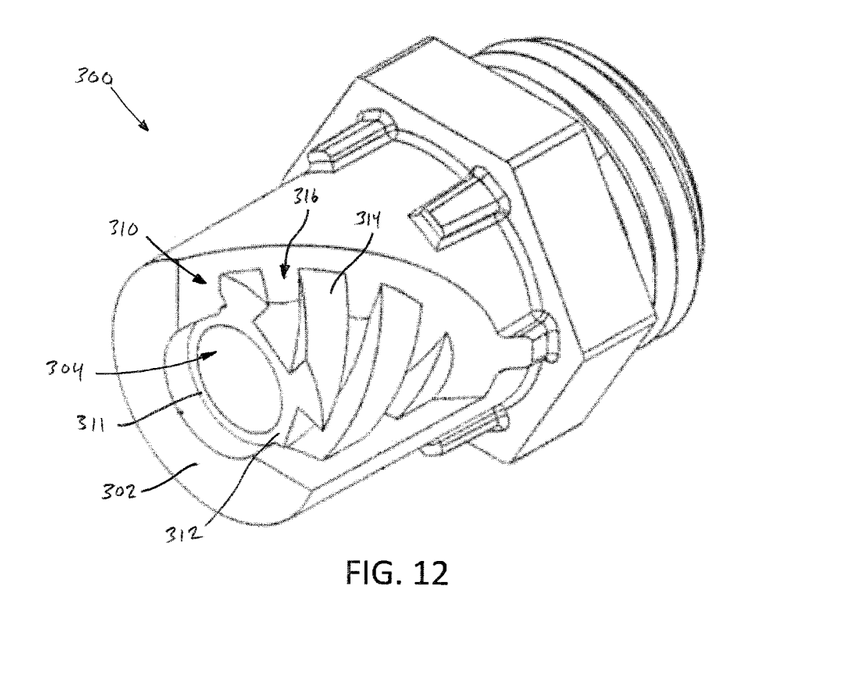
FIG. 12 is a cutaway view of the exemplary nut formed around the insert of FIG. 10 before threads are formed on the inner diameter.
Figure 13:
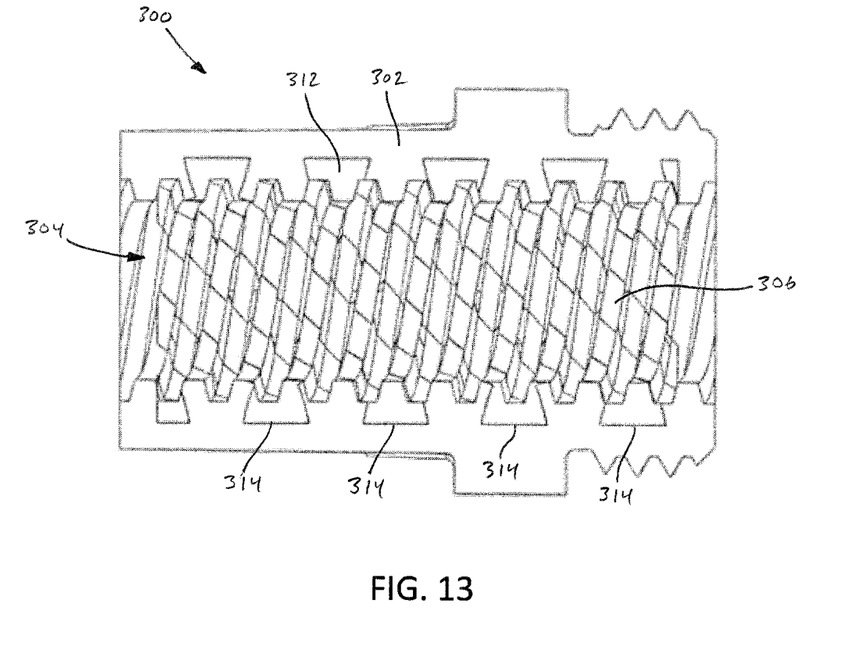
FIG. 13 is a cross-section view of the exemplary nut of FIGS. 11-12 after threads are formed on the inner diameter.
Figure 14:
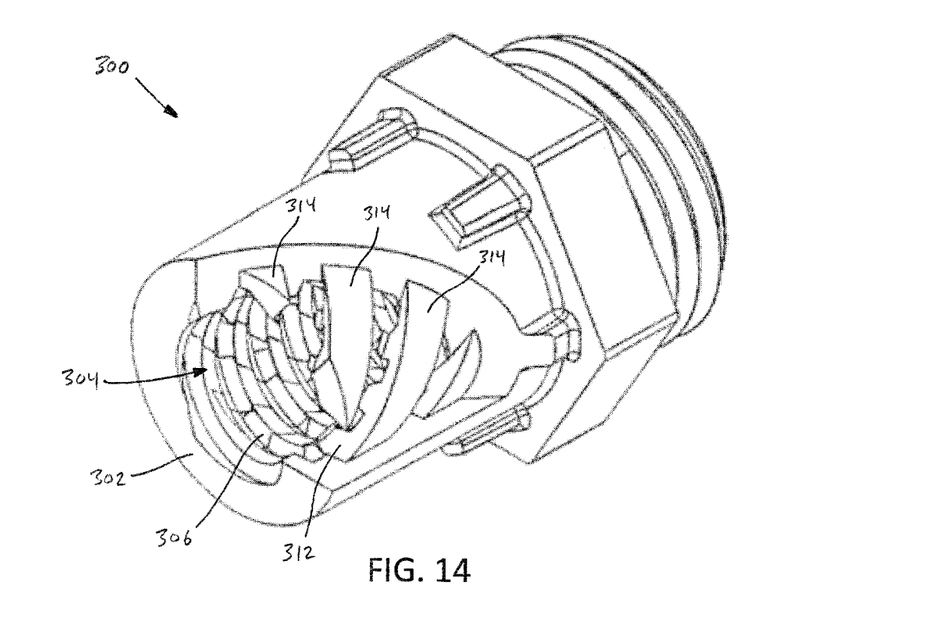
FIG. 14 is a cutaway view of the exemplary nut of FIGS. 11-12 after threads are formed on the inner diameter.

Referring now to FIGS. 10-14, an exemplary lead screw nut 300 having a spiral fluted insert 310 is shown. FIG. 10 shows the spiral fluted insert 310 having a body 311, an inner diameter 304 and five flutes 314 having a larger diameter than the body 311, the flutes 314 being separated by gaps 316. The insert 310 is formed from an insert material 312. FIGS. 11 and 12 show cross-section and cutaway views of the insert 310 after the nut 300 has been formed around the insert 310. To form the nut 300, the insert 310 is placed in a mold and then a nut material 302 is molded over the insert 310. After the nut 300 is formed around the insert 310, threads 306 are formed on the inner diameter 304. As can be seen in FIGS. 13 and 14, which show cross-section and cutaway views of the nut 300 with formed threads 306, the thread forming step removes the body 311 of the insert leaving the flutes 314 made from the insert material 312 embedded in the nut 300 made from the nut material 302. In this exemplary embodiment, the nut material 302 would typically be a stronger material than the insert material 312, such as acetal, (or PPS or PEEK or PA, etc.), for example, and the insert material 312 would typically be a material with a lower friction than the nut material 302, such as PTFE (or PTFE-MF or PTFE-PI or PFTE/PPS, etc.), for example.

The shape of the insert 310 can be adjusted to give any desired proportion of the insert material 312 to the nut material 302 that may be desired. In certain embodiments, the spiral fluted insert may have two flutes, three flutes, four flutes, or six or more flutes. Additionally, the insert need not be uniform in cross section from end to end. For example, the radial width of the flutes and gaps may also be varied to alter the proportion of the insert material present on the surface of the threads. Each flute may have the same width, or the flutes may have varying widths. Additionally, the flutes may have a width that varies along the length of the flute. The pitch of the spiral of the flutes may be varied by any amount, and may change along the length of the insert. In certain embodiments, the pitch of the spiral is approximately the same as the pitch of the threads such that one or more threads is formed of the insert material. The flutes may also be formed in a non-spiral pattern, such as a zig-zag, a sine wave, a square wave, or the like.

In this example, in the final nut, about 50% (48%-52%) of the surface area of the threaded region is nut material 302 and about 50% (52%-48%) of the surface area of the threaded region is insert material 312. This percentage can be controlled by the width of the flutes 314 and gaps 316 used in the process. In various exemplary nut embodiments using the fluted insert, about 45%-55% of the surface area of the threaded region is nut material 302 and about 55%-45% of the surface area of the threaded region is the insert material 312. In various other exemplary nut embodiments using the fluted insert, about 40%-60% of the surface area of the threaded region would be nut material 302 and about 60%-40% of the surface area of the threaded region would be insert material 312.

Figure 15:
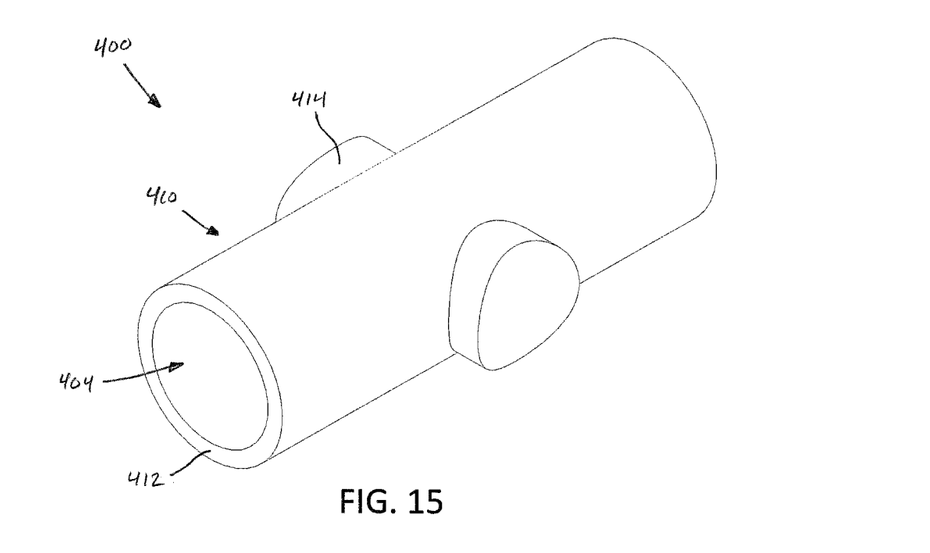
FIG. 15 is an isometric view of an exemplary insert of an exemplary nut before the nut is formed around the insert.
Figure 16:
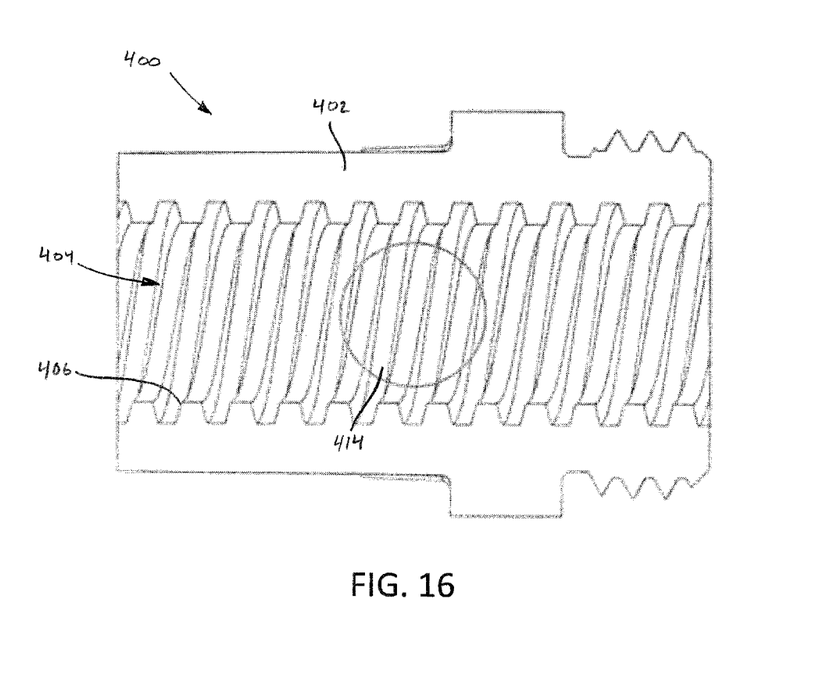
FIG. 16 is a cross-section view of the exemplary nut formed around the insert of FIG. 15 after threads are formed on the inner diameter.

Referring now to FIGS. 15-16, an exemplary lead screw nut 400 having an insert with posts 410 is shown. FIG. 4 shows the insert 410 having a cylindrical body 411, an inner diameter 404 and two cylindrical posts 414 that extend from the body 411. The insert 410 is formed from an insert material 412. FIG. 16 shows a cross-section view of the insert 410 after the nut 400 has been formed around the insert 410 and threads 406 have been formed on the inner diameter 404. To form the nut 400, the insert 410 is placed in a mold and then a nut material 402 is molded over the insert 410. After the nut 400 is formed around the insert 410, threads 406 are formed on the inner diameter 404. As can be seen in FIG. 16, the thread forming step removes the cylindrical body 411 of the insert leaving the posts 414 made from the insert material 412 embedded in the nut 400 made from the nut material 402. In this exemplary embodiment, the nut material 402 would typically be a stronger material than the insert material 412, such as acetal, (or PPS or PEEK or PA, etc.), for example, and the insert material 412 would typically be a material with a lower friction than the nut material 402, such as PTFE (or PTFE-MF or PTFE-PI or PFTE/PPS, etc.), for example.

The shape of the insert 410 can be adjusted to give any desired proportion of the insert material 412 to the nut material 402 that may be desired. As mentioned herein, the insert with posts need not have two posts, but it can have two posts. Exemplary inserts can have three or four or five or more posts. Additionally, the longitudinal portion of the insert need not be uniform from end to end. The posts may extend opposite each other, as shown, or may be positioned on the same side of the cylindrical body, or any location. The posts may have any size or shape to change the size and shape of the portion of the threads formed from the material of the insert, and each post may be the same or different from other posts in size and shape.

In this example, in the final nut, about 90% (88%-92%) of the surface area of the threaded region is nut material 402 and about 10% (12%-8%) of the surface area of the threaded region is insert material 412. This percentage can be controlled by the number and shape of the posts 414 used in the process. In various exemplary nut embodiments using the insert with posts, about 45%-55% of the surface area of the threaded region is nut material 402 and about 55%-45% of the surface area of the threaded region is insert material 412. In various other exemplary nut embodiments using the insert with posts, about 40%-60% of the surface area of the threaded region would be nut material 402 and about 60%-40% of the surface area of the threaded region would be insert material 412.

In some exemplary embodiments, the molded nut has an electronic microchip that has been overmolded into the nut. In some exemplary embodiments, the electronic microchip includes a power supply and a control unit electrically connected to a sensor and a transmitter or transceiver. The control unit receives sensor data from the sensor and transmits the sensor data via the transmitter or transceiver to devices outside the nut. In exemplary embodiments, an App running on a portable computer (e.g., a cell phone) proximate the nut with the embedded microchip uses communications circuitry of the portable computer to communicate with the microchip control unit via the control unit's transceiver to receive sensor data from the microchip embedded in the nut. In addition or in the alternative, in some exemplary embodiments, a device using the nut has communications circuitry and communicates with the microchip control unit via the control unit's transceiver to receive sensor data from the microchip embedded in the nut. In exemplary embodiments, the sensor comprises one or more of a temperature sensor (permitting the microchip to sense and transmit a temperature of the nut or some other temperature associated with the nut), an accelerometer or vibration sensor (permitting the microchip to sense and transmit vibration data about the nut or some other physical parameter, such as acceleration or velocity of the nut), and/or a proximity sensor or position sensor (permitting the microchip to sense and transmit location information about the nut, e.g., a Hall effect sensor or other sensor that detects when the nut is in a particular location, such as proximate a magnet in a reference location on a device using the nut). Very small microchips having sensors (e.g., temperature sensors), a power supply, a control unit, and a transmitter or transceiver are known to those skilled in the art and available commercially.

In exemplary embodiments, the power supply comprises a battery and/or a receiver to receive electromagnetic radiation, such as near-field communication (NFC) signals, and convert the electromagnetic radiation into electric power to power the microchip. In exemplary embodiments, the control units herein comprise logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a state machine, a software controlled processor, discrete logic such as an application specific integrated circuit (ASIC), a programmed logic device, or other programmed processor. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), complex programmable logic devices (CPLDs), etc. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

Some exemplary methods comprise, providing a nut having an embedded microchip, the microchip comprising a control unit in electrical communication with a sensor and a transmitter; and transmitting with the transmitter sensor data about a measured parameter of the nut detected by the sensor (e.g., transmitting raw data from the sensor or sensor data modified by the control unit). Some other exemplary methods further comprise transmitting the data or sending warning data when sensor data indicates the measured parameter of the nut exceeds a threshold or meets some other condition indicating that the nut needs maintenance or needs to be replaced, e.g., when the nut temperature as measured by the sensor is X degrees above a threshold temperature Y and/or the nut temperature as measured by the sensor is rising at a certain rate indicating that the nut needs maintenance or needs to be replaced, either of which might be caused by too much friction between a nut and a corresponding screw, such as a lead screw. Some other exemplary methods further comprise transmitting the data or sending warning data when sensor data indicates that the nut is vibrating (or had been vibrating) at an intensity and/or a frequency as measured by the sensor indicating that the nut needs maintenance or needs to be replaced. Some other exemplary methods further comprise replacing the nut or performing maintenance on the nut before failure of the nut based on the sensor data transmitted from the microchip. In some exemplary methods, a user walks from device to device (each having a nut with an embedded microchip) with a smart phone running an App that communicates with the microchip in each nut collecting sensor data from all the nuts the user passes as the user walks around.

Figure 17:
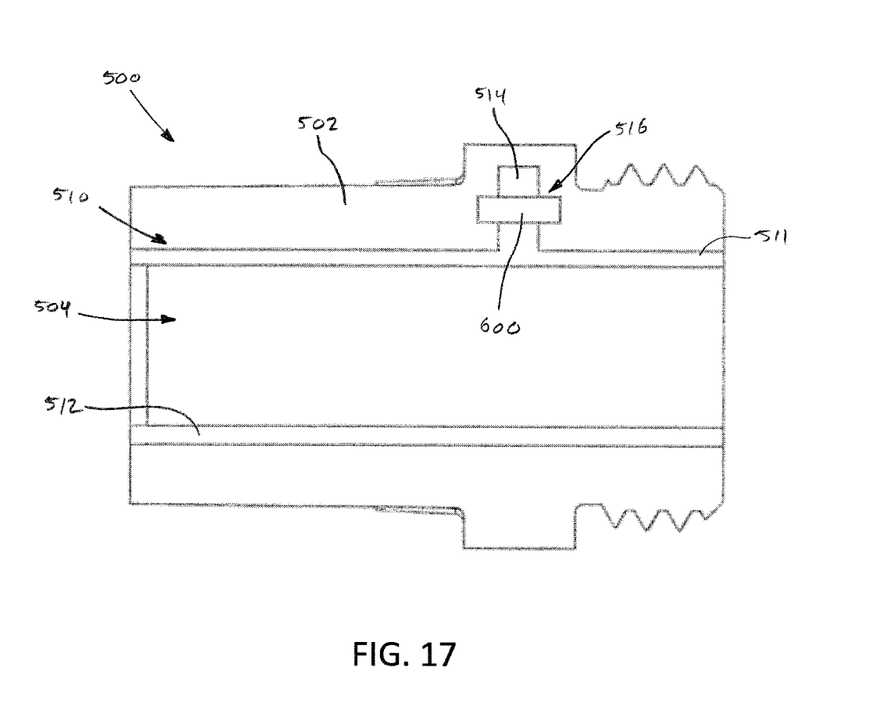
FIG. 17 is a cross-section view of an exemplary nut before threads are formed on the inner diameter.
Figure 18:
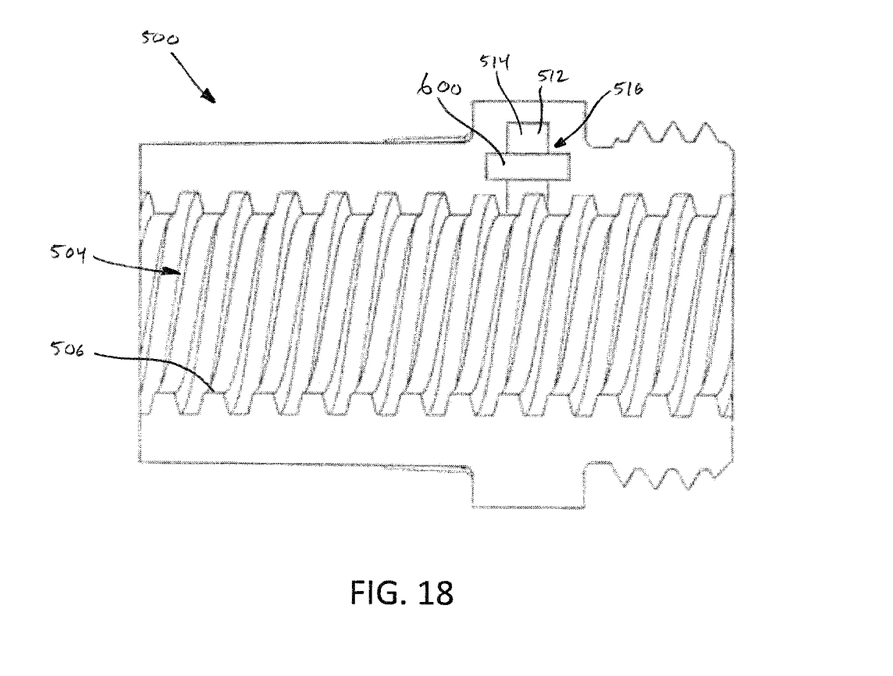
FIG. 18 is a cross-section view of the exemplary nut of FIG. 16 after threads are formed on the inner diameter.
Figure 19:
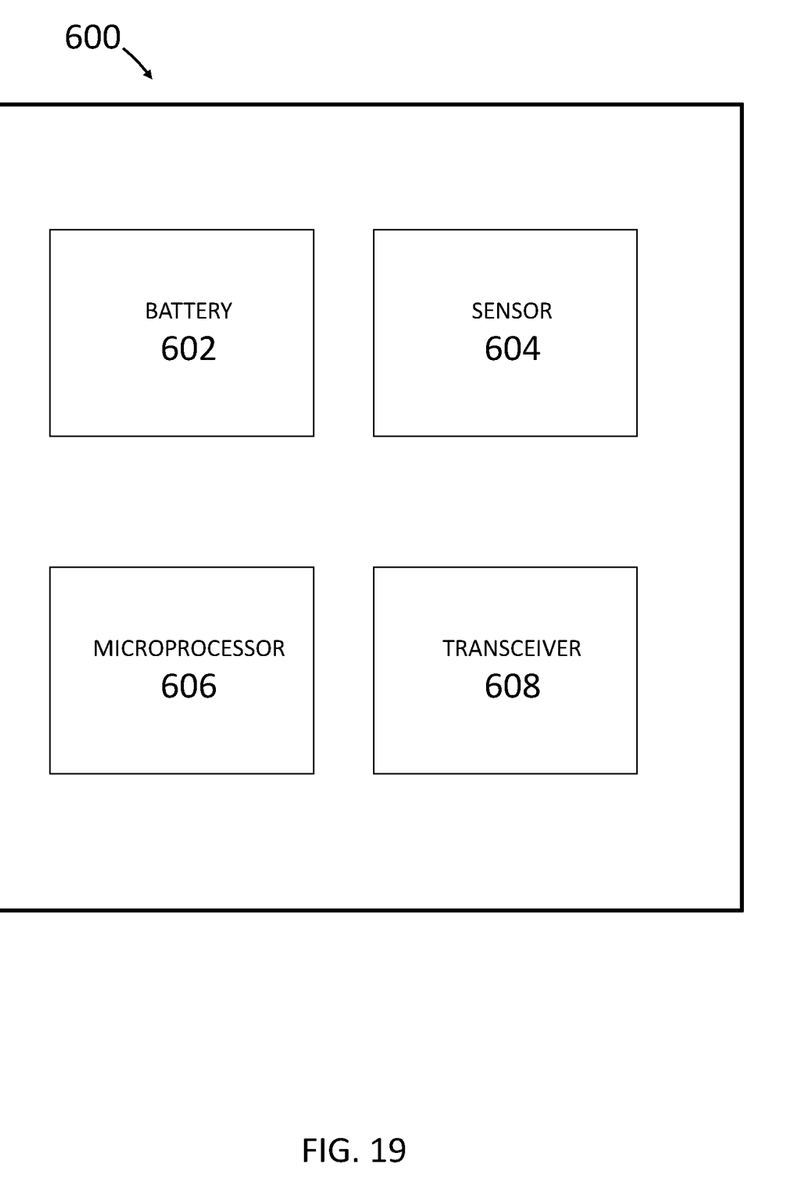
FIG. 19 is a block diagram of an electronic device for use in the nut of FIGS. 16-17.

Referring now to FIGS. 17-19, an exemplary "smart" lead screw nut 500 including an electronic device 600 is shown. FIG. 16 shows a cross-section view of the nut 500 that has been formed around an insert 510. The insert 510 has a cylindrical body 511, an inner diameter 504, and a holder 514 that extends from the body 511, the holder 514 including an opening 516 configured to receive the electronic device 600. The insert 510 is formed from an insert material 512. To form the nut 500, the electronic device 600 is inserted into the opening 516, the insert 510 is placed in a mold, and then a nut material 502 is molded over the insert 510 and the electronic device 600. After the nut 500 is formed around the insert 510, threads 506 are formed on the inner diameter 504. As can be seen in FIG. 17, the thread forming step removes the cylindrical body 511 of the insert leaving the holder 514 made from the insert material 512 embedded in the nut 500 made from the nut material 502. The shape of the insert 510 can be adjusted to give any desired proportion of the insert material 512 to the nut material 502 that may be desired. Any of the inserts 110, 210, 310, 410 described above can be modified to include a holder for an electronic device.

FIG. 19 shows a block diagram of the components of the electronic device 600, which may be an electronic chip, board, or a microelectomechanical device. The electronic device 600 includes a battery 602, a sensor 604, a microprocessor 606, and a transceiver 608. The sensor 604 may be any kind of sensor, such as a temperature sensor, an accelerometer, a stress sensor, a strain sensor, or the like. In certain embodiments, the sensor 604 is a hall effect sensor that detects the presence of magnet outside the nut to indicate the position of the nut along the lead screw. The device 600 may be configured to transmit a signal when a property, such as temperature or vibration, measured by the sensor 604 exceeds a predetermined threshold. In certain embodiments, the predetermined threshold may be determined by similar measurements received from other nuts. For example, a nut experiencing vibration or temperature about 5% greater than other nuts in similar applications may transmit an alert. The transceiver 608 allows the device 600 to communicate with other "smart" nuts or with the equipment that includes the nut. A handheld device such as a smart phone may also be used to check data collected by the device 600. In certain embodiments, the smart nuts may form a mesh network such that data is passed between the nuts data from multiple nuts may be collected by reading data from one nut. Data may also be received by the nut to update the firmware of the device 600 or to store information about smart nut, such as the location of the nut, the machine the nut is used in, the serial number of the nut, the production date of the nut, the materials used in the nut, and the like.

An exemplary apparatus comprises: a lead screw having a lead screw drive; a lead screw nut on the lead screw and having an embedded microchip, the microchip comprising a microchip control unit in electrical communication with a sensor and a microchip transmitter for transmitting with the microchip transmitter sensor data about a measured parameter of the lead screw nut detected by the sensor; a device control unit in electrical communication with and controlling the lead screw drive and a device receiver for receiving sensor data about the measured parameter of the lead screw nut detected by the sensor and transmitted by the microchip; and wherein the device control unit has logic for receiving the sensor data, logic for analyzing the sensor data to determine whether the measured parameter of the nut exceeds a threshold or meets some other condition indicating that the nut needs maintenance or needs to be replaced, and logic for providing a warning if the measured parameter of the lead screw nut exceeds a threshold or meets some other condition indicating that the lead screw nut needs maintenance or needs to be replaced. Some exemplary apparatuses further comprise a device transmitter for transmitting a signal to a remote computer indicating that sensor data indicates that the lead screw nut needs maintenance or needs to be replaced. In some exemplary methods, such devices are provided, collect sensor data from their respective (or other) nut microchips, and transmit to a remote computer the sensor data and/or indications that sensor data indicates that the lead screw nut needs maintenance or needs to be replaced An exemplary method of making a nut with an embedded microchip comprises, providing a microchip; affixing the microchip to a mold insert at a location of the insert where the microchip will be embedded in the nut during overmolding; and over-molding the insert to form the nut with the embedded microchip. In some exemplary embodiments, the mold insert has an opening (all the way through) or a slot, recess, or depression (not all the way through) into which the microchip is affixed before over-molding. In some exemplary embodiments, the opening, slot, recess, or depression for affixing the microchip is formed in the mold insert when the mold insert is molded.

Figure 20:
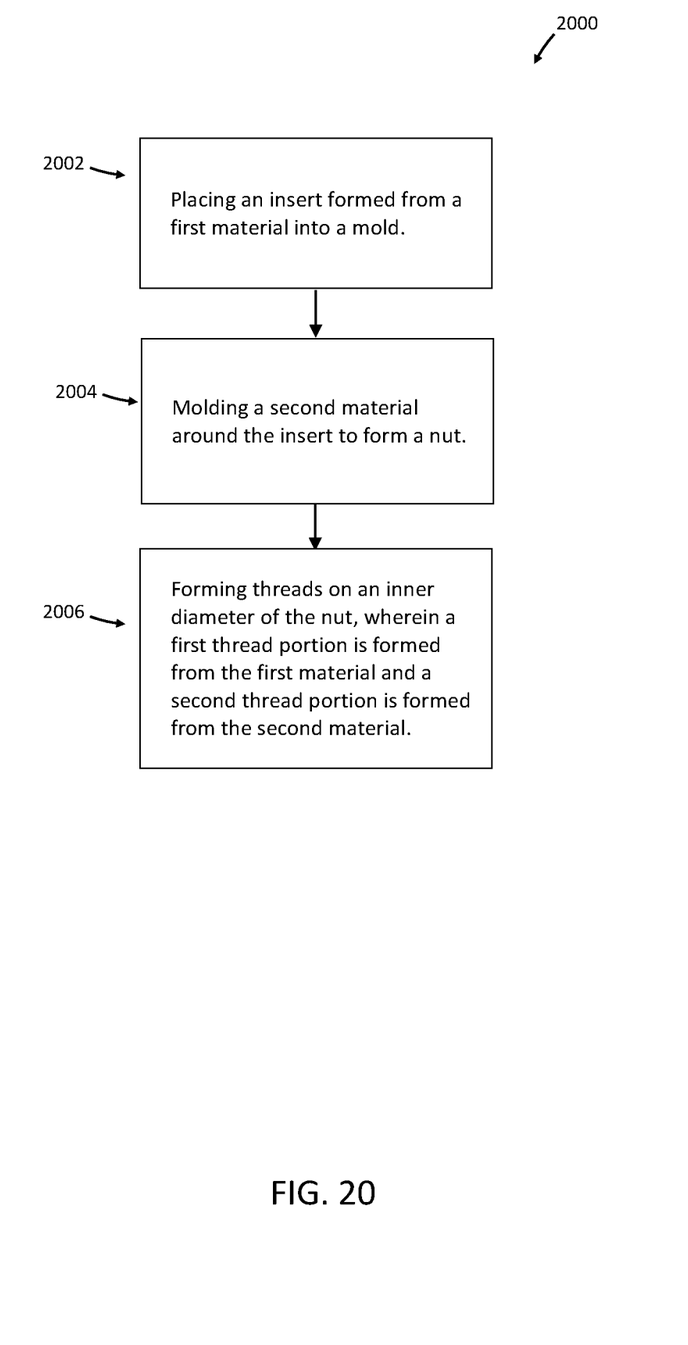
FIG. 20 is a flow chart describing an exemplary method of making nuts having threads formed from different materials.

Referring now to FIG. 20, a flow chart of an exemplary method 2000 of forming lead screw nuts having threads formed from different materials is shown. The exemplary method 2000 includes: placing an insert formed from a first material into a mold, at 2002; molding a second material around the insert to form a nut, at 2004; and forming threads on an inner diameter of the nut, wherein a first thread portion is formed from the first material and a second thread portion is formed from the second material, at 2006. Exemplary method 2000 can be used to form any of the exemplary lead screw nuts described above.

The inserts 110, 210, 310, 410, 510 described above can be formed in any of a number of suitable manners, e.g., molding the first material in a cavity, machining a piece of the first material, extruding the first material; depositing the first material, e.g., with a molten material dispenser or a 3D printer, etc. Any combination of the features of the inserts 110, 210, 310, 410, 510 is also contemplated. For example, the features of a straight fluted insert may be combined with the features of a dumbbell shaped insert to produce an insert having straight flutes that are segmented. Similarly, the features of a spiral fluted insert can be combined with the features of a dumbbell shaped insert to provide a segmented spiral fluted insert.

FIGS. 8-9, 11-12, and 14 show exemplary external configurations for a lead screw nut. This exemplary external configuration has six way rotational symmetry about its longitudinal axis, except for the threads on the left side of the figures. Obviously, this external configuration need not be used in the teachings herein could be used to provide special threads in virtually any type of threaded device having virtually any kind of external configuration, such as straight nuts, flanged nuts, block nuts, trunion nuts, etc.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. For example, a solid tubular insert can be used to allow the threads to be cut, or formed, entirely in the insert material. As another example, in some the above embodiments, such as the dumbbell embodiment and the fluted embodiment, the ID of the insert can be sized so that when the threads are cut, the threads are formed only by the insert material. As yet another example, the inserts herein are shown with a central longitudinal opening, which facilitates over molding (the insert is placed over a piece which holds it in place in the mold during over molding); in the alternative, the insert can be formed without such a central longitudinal opening. As yet still another example, could be an insert that extends in whole or in part entirely from the inside surface to the outside surface, as in the 2D or 3D spike example, to, for instance, dissipate static electric charge using an insert material that is electrically conductive. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A lead screw nut, comprising:
 a body extending from a first end to a second end, the body having a threaded opening having a thread region, the threaded opening extending from the first end to the second end;
 a first portion of the thread region that is formed from a first material; and
 a plurality of second portions of the thread region that are formed from a second material; and
 wherein the first and second materials have different properties; and
 wherein the first portion of the thread region extends between at least two of the second portions of the thread region; and
 wherein the body is formed by:
  forming an insert out of the first material; and
  over molding the second material over the insert; and
  tapping the thread region of the lead screw nut, leaving the first portion formed from the first material and the second portion formed from the second material, and wherein the first portion and the second portion are aligned to form one or more continuous threads of the thread region.

2. The lead screw nut according to claim 1, wherein the first material is a low friction material and the second material is a relatively high strength material.

3. The lead screw nut according to claim 2, wherein the first material comprises PTFE and the second material comprises acetal.

4. The lead screw nut according to claim 2, wherein the first material consists essentially of PTFE and the second material consists essentially of acetal.

5. The lead screw nut according to claim 1, wherein:
 before over molding the insert has a dumbbell shaped outer surface; and tapping the thread region forms a plurality of first portions of the thread region that are spaced apart from each other by at least one second portion of the thread region.

6. The lead screw nut according to claim 1, wherein:
before over molding the insert has a helical shaped outer surface; and
tapping the thread region forms a plurality of first portions of the thread region that have a helical shape that intersects with a plurality of threads of the thread region.

7. The lead screw nut according to claim 1, wherein:
before over molding the insert has a double helical shaped outer surface; and
tapping the thread region forms a plurality of first portions of the thread region that have a double helical shape that intersects with a plurality of threads of the thread region.

8. The lead screw nut according to claim 1, wherein:
before over molding the insert has an outer surface with a plurality of flutes; and
tapping the thread region forms a plurality of first portions of the thread region that are circumferentially spaced apart from each other by at least one of second portions of the thread region.

9. The lead screw nut according to claim 1, wherein:
before over molding the insert has an outer surface with circular posts extending from the outer surface; and
tapping the thread region forms a plurality of first portions of the thread region having a round shape.

10. The lead screw nut according to claim 1, wherein the insert before over molding has an electronic chip, board, or micro-electromechanical device embedded into it, wherein each of the electronic chip, the board, and the micro-electromechanical device comprise a microchip.

11. A lead screw nut, comprising:
a body having a threaded opening having a thread region, the body being formed from at least first and second materials having different properties;
a first portion of the thread region that is formed from the first material; and
a second portion of the thread region that is formed from the second material; and
a plurality of boundaries formed where the first and second portions of the thread region contact each other;
wherein the body is formed by:
    forming an insert out of the first material; and
    over molding the second material over the insert; and
    tapping the thread region of the lead screw nut, leaving the first portion formed from the first material and the second portion formed from the second material, and wherein the first portion and the second portion are aligned to form one or more continuous threads of the thread region.

12. The lead screw nut of claim 11, wherein at least one of the plurality of boundaries extends longitudinally along at least a portion of the threaded opening.

13. The lead screw nut of claim 12, wherein at least one of the plurality of boundaries extends from a first end of the threaded opening to a second end of the threaded opening.

14. The lead screw nut of claim 11, wherein the thread region includes four boundaries formed between the first portions and the second portions.

15. The lead screw nut of claim 11, wherein the thread region includes eight boundaries formed between the first thread portions and the second thread portions.

16. The lead screw nut of claim 1, wherein the first portion of the thread region is circumscribed by the second portion of the thread region.

17. The lead screw nut of claim 1, wherein the second portion of the thread region is circumscribed by the first portion of the thread region.

18. The lead screw nut of claim 11, wherein one of the first portion and the second portion is circumscribed by the other of the first portion and the second portion.

19. A lead screw nut, comprising:
a body extending from a first end to a second end, the body having a threaded opening having a thread region, the threaded opening extending from the first end to the second end;
a first portion of the thread region that is formed from a first material; and
a plurality of second portions of the thread region that are formed from a second material; and
wherein the first and second materials have different properties; and
wherein the first portion of the thread region extends between at least two of the second portions of the thread region;
wherein the body is formed by:
    forming a plurality of inserts out of the first material; and
    over molding the second material over the inserts; and
    tapping the thread region of the lead screw nut, leaving first portions of the thread region formed from the first material and second portions of the thread region formed from the second material.

20. The lead screw nut according to claim 19, wherein:
before over molding the plurality of inserts have a jack shaped outer surface; and
tapping the thread region forms a plurality of oval-shaped first portions of the thread region.

21. The lead screw nut according to claim 19, wherein:
before over molding the plurality of inserts have a spiked outer surface; and
tapping the thread region forms a plurality of oval-shaped first portions of the thread region.

* * * * *